United States Patent

[11] 3,588,654

| | | | | |
|---|---|---|---|---|
| [72] | Inventor | Miklos Balazs Stoke-On-Trent, England | | |
| [21] | Appl. No. | 810,662 | | |
| [22] | Filed | Mar. 26, 1969 | | |
| [45] | Patented | June 28, 1971 | | |
| [73] | Assignee | International Computers Limited London, England | | |
| [32] | Priority | Apr. 11, 1968 | | |
| [33] | | Great Britain | | |
| [31] | | 17562/68 | | |

[54] SPEED INDICATING APPARATUS FOR ELECTRIC MOTORS
1 Claim, 2 Drawing Figs.

[52] U.S. Cl. ................................................ 318/331, 318/341
[51] Int. Cl. ................................................ H02p 5/16
[50] Field of Search ...................................... 318/341, 314, 318, 328, 345, 331

[56] References Cited
UNITED STATES PATENTS

| | | | | |
|---|---|---|---|---|
| 3,214,666 | 10/1965 | Clerc | | 318/331X |
| 3,398,345 | 8/1968 | James | | 318/341 |

Primary Examiner—Oris L. Rader
Assistant Examiner—Robert J. Hickey
Attorney—Hane and Baxley

ABSTRACT: Apparatus is disclosed for controlling the speed of an electric motor. The armature of the motor is driven by a succession of discrete pulses, the armature being unenergized during the time intervals occurring between successive pulses. The voltage across the armature is sampled during the time interval between successive energization pulses to produce a speed feedback signal which is compared with a reference signal and a speed error signal is generated to control the energization of the armature.

FIG. I

SPEED INDICATING APPARATUS FOR ELECTRIC MOTORS

BACKGROUND OF THE INVENTION

The present invention relates to apparatus for indicating the speed of electric motors and to apparatus for controlling the speed of electric motors.

The invention relates in particular to apparatus for indicating the speed of electric motors having their armatures energized by discrete pulses of electrical energy.

SUMMARY OF THE INVENTION

According to the present invention apparatus responsive to the speed of an electric motor includes drive means to energize the armature of the electric motor in each of a succession of spaced time periods with a pulse of electrical energy, the armature being unenergised during time intervals occurring between successive ones of the time periods; means operative to generate sampling signals in the time intervals between successive energizations of said armature; sampling means rendered operative by said sampling signals to sense the armature voltage during said time intervals and to produce an output signal indicative of the voltage across the armature and hence of the speed of the electric motor.

DESCRIPTION OF THE PREFERRED EMBODIMENT

Figure 1:
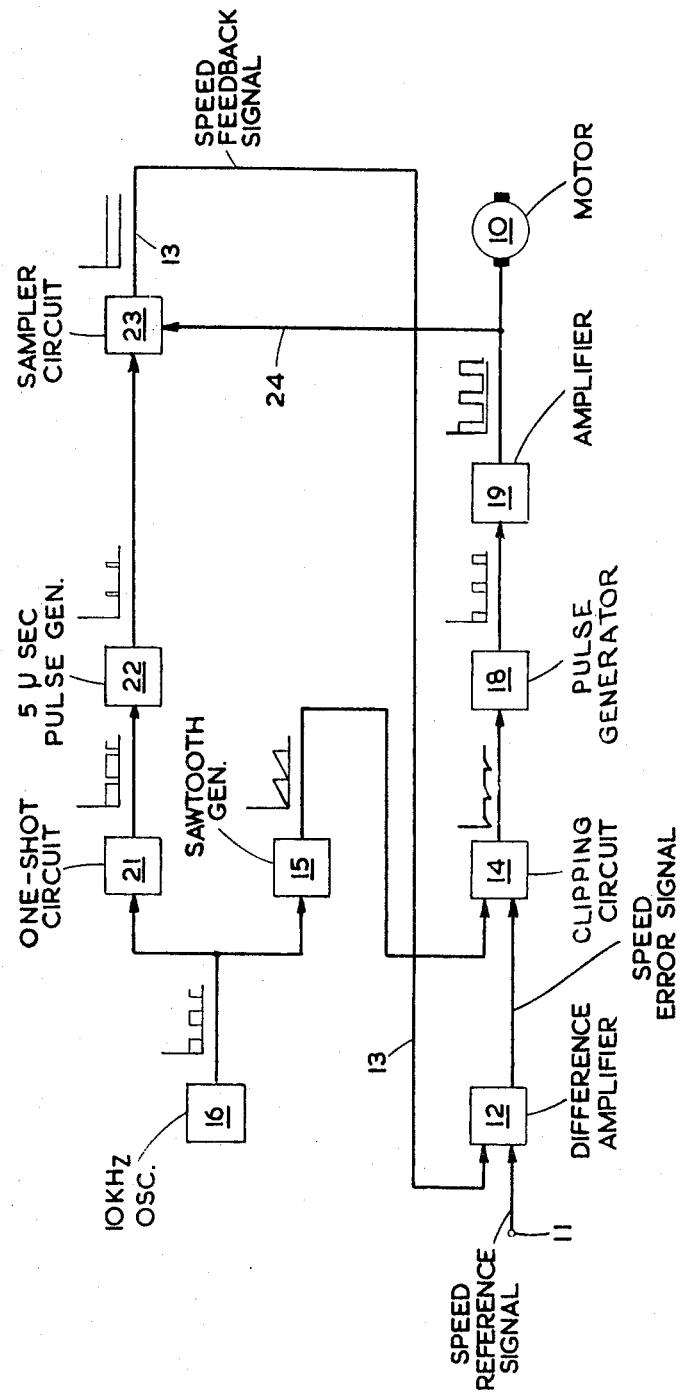
FIG. 1 shows a block schematic diagram of a motor control system.

Referring now to FIG. 1, the control system is shown in its application to the accurate speed control of a DC electric motor 10 for example for driving a capstan (not shown) of a magnetic tape unit in a computer installation. The DC electric motor 10 may have an armature winding in the form of a printed circuit carried by an annular insulating disc of low inertia, and field energization provided by stationary magnets mounted axially to the armature winding to produce an axially aligned field in which the armature winding to produce an axially aligned field in which the armature disc rotates. Such a motor is well known and is therefore not shown or described in detail.

Figure 2:
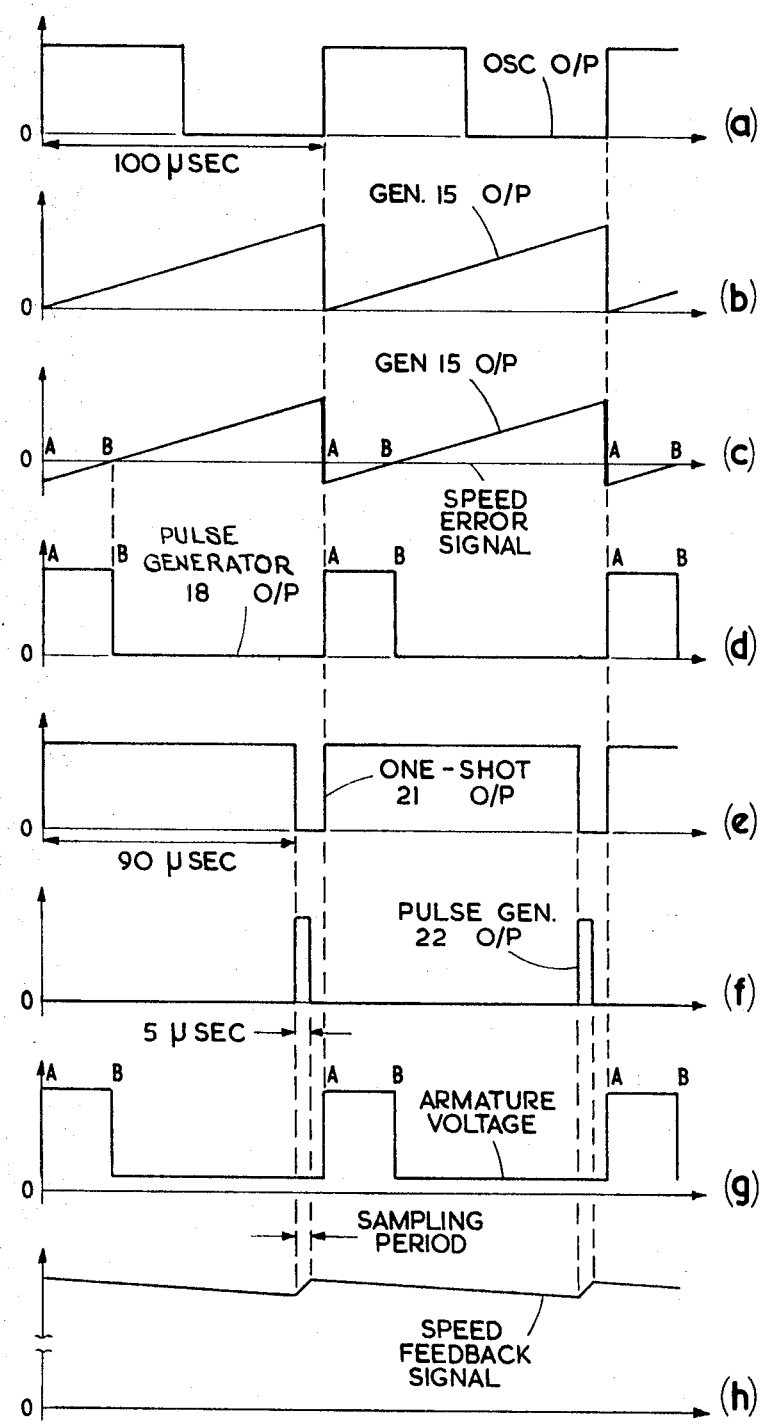
FIG. 2 shows the waveforms occurring within the system.

Referring now to FIGS. 1 and 2, the operation of the control system shown in FIG. 1 will not be described.

It will be assumed for the purpose of the description that steady state conditions of operation obtain with the motor operating at a constant speed.

The oscillator 16 produces square wave pulses at a frequency of 10 kHz. which are applied to a sawtooth waveform generator 15. The output from the sawtooth generator 15 also has a frequency of 10 kHz. and is synchronized by the square waves from oscillator 16. The time relationship of the sawtooth waveform and the output from the oscillator 16 is shown in FIGS. 2(a) and 2(b). The clipping circuit 14 receives the output from the sawtooth generator 15 and also receives a speed error signal the amplitude of which varies in dependence upon the difference between the actual speed of the motor and the desired speed of the motor. The generation of the speed error signal will be described later. The clipping circuit 14 cuts off the positive peaks of the sawtooth waveform above the amplitude of the speed error signal to produce an output of negative signals of duration AB as shown in FIG. 2(c). As steady state conditions of operation obtain, the speed error signal is approximately zero, and under these conditions the relationship of the magnitudes of the inputs to the clipping circuit 14 is also shown in FIG. 2(c). In response to the output from the clipping circuit 14 the pulse generator 18 produces positive pulses of width AB as shown in FIG. 2(d). These pulses are amplified by amplifier 19 and are utilized to energize the armature of the motor 10.

The output from the oscillator 16 is also applied to a one shot circuit 21 which generates positive pulses of 90 $\mu$secs. duration at a frequency of 10 kHz. in response to the leading edges of the pulses from the oscillator as shown in FIG. 2(e). These pulses are applied to a further pulse generator 22 which produces positive pulses of 5 $\mu$secs. duration in response to the trailing edges of the 90 $\mu$sec. pulses. Thus it will be seen by referring to FIG. 2 that as long as the pulses applied to the armature never exceed 90 $\mu$secs. in length, the 5 $\mu$sec. pulses from the pulse generator 22 occur during periods when the armature is not energized and is therefore generating a back E.M.F. The sampler circuit 23 is rendered operative by the 5 $\mu$sec. pulses from the pulse generator and also receives along line 24 the voltage on the armature as shown in FIG. 2(g) and is responsive to this voltage only when the 5 $\mu$sec. pulse is present. The sampler circuit 23 includes an RC network having a time constant which is large compared with the 100 $\mu$sec. cycle time. The capacitor in this network is charged during each 5 $\mu$sec. pulse by the armature voltage. Since the RC network has a large time constant the voltage across the capacitor remains substantially constant until the arrival of the next 5 $\mu$sec. pulse. The voltage across the capacitor (shown magnified in FIG. 2(h)) is therefore proportional to the motor speed and forms the speed feedback signal which is applied to a difference amplifier 12 along the line 13. A speed reference signal is applied to the difference amplifier 12 via terminal 11, the amplitude of which is determined by the speed at which the motor is required to operate. The output of the difference amplifier 12, proportional to the amplified error between the speed reference signal and the speed feedback signal, provides the speed error signal which is applied to the clipping circuit 14.

If, for any reason, the motor load is increased and causes the motor to slow down, the speed feedback signal on the line 13 is correspondingly reduced in magnitude and the speed error signal from the difference amplifier 12 goes correspondingly positive. This has the effect of increasing the duration of the periods AB in FIG. 2(c) because the sawtooth waveform is cut off above a higher level. The mark/space ratio, and hence the average power value, of the motor armature input therefore increases to maintain the motor speed substantially constant. Correspondingly, a decrease in the motor load reduces the mark/space ratio of the motor armature input again maintaining the motor speed substantially constant.

It will thus be seen that the speed control system will maintain the motor speed substantially constant at a value dependent upon the magnitude of the speed reference signal.

If desired, a positive limit, e.g. 80 $\mu$secs., may be imposed on the duration of the pulses supplied to the motor armature. This could be effected, for example, by a pulse width limiting circuit connected between the pulse generator 18 and the amplifier 19. Thus what ever the load and speed requirements of the motor, the motor armature cannot be externally energized during the 5 $\mu$sec. sampling pulse.

The sampler circuit 23 is provided with a high input impedance to the line 24 so that while armature voltage sampling is taking place, i.e. during the 5 $\mu$secs. pulses from the generator 22, the armature current is small so that voltage drop in the motor armature winding and commutation effects have no substantial effect.

It will be understood that in the system described above the speed feedback signal provided for closed loop speed control is derived directly from the motor armature voltage and not, as would normally be the case, from a tachogenerator coupled to the motor. By such an arrangement the accuracy of the speed control can be increased and/or the system cost reduced.

Many arrangements within the scope of the invention are possible by which the speed of an electric motor energized with pulses of variable mark/space ratio may be ascertained by sensing the armature voltage during null periods of armature energization.

Although the invention is shown and described in its application to the closed loop speed control of an electric motor it will be appreciated that the invention is not so limited. For example, the signal on the line 13 in FIG. 1 could be used merely to provide indication of the speed of the motor 10, the motor itself being controlled by any other system, closed loop or open loop, by which the motor is energized with pulses of variable mark/space ratio. It will be appreciated, however, that the sampling periods of the sampler circuit would need to be phased to correspond to null periods of energization of the motor armature.

The invention is not restricted in application to electric motors which are required only to rotate in one direction, and may be applied to electric motors which are required to operate in either direction of rotation.

Whereas in the embodiment shown and described the detection of null periods of motor armature energization is effected by circuitry which is responsive to the oscillator provided also for gating the pulses of the armature energization, it will be appreciated that the null periods can be detected from other parts of the armature energization circuit and could, for example, be detected directly from the armature voltage itself.

I claim:

1. Motor control apparatus including an oscillator which produces a series of pulses, means to apply said oscillator pulses to both a sawtooth wave generator and a one-shot circuit which circuit produces pulses during spaced time periods, the time periods being separated by time intervals which are substantially shorter than the time periods, means to apply the output signals of said one-shot circuit to a first pulse generator which upon the occurrence of the trailing edge of each said output signal produces a pulse in each of said time intervals, means to apply said pulses from said first pulse generator to a sampler circuit, a pulse amplifier connected to apply driving pulses to a motor, the armature winding of which is connected to said sampler circuit such that the sampler circuit passes the back EMF of said motor as an output signal to a difference amplifier during said time intervals, means to apply a speed reference signal to said difference amplifier, the output of said difference amplifier being an error speed signal, means to apply the output of said sawtooth generator and said error speed signal to a clipping circuit which produces a series of clipped sawtooth wave pulses, means to apply said clipped pulse to a second pulse generator which produces substantially square pulses, the duration of which corresponds to the amplitude of said clipped pulses and means to apply said square pulses to said pulse amplifier such that the motor is energized by signals representative of the difference between said back EMF and said speed reference signal.